US006931785B1

(12) United States Patent
Johnson

(10) Patent No.: US 6,931,785 B1
(45) Date of Patent: Aug. 23, 2005

(54) SIMULATED TURTLE FISHING LURE APPARATUS

(76) Inventor: Steve M. Johnson, 418 Christian Bend Rd., Church Hill, TN (US) 37642

( * ) Notice: Subject to any disclaimer, the term of this patent is extended or adjusted under 35 U.S.C. 154(b) by 0 days.

(21) Appl. No.: 10/809,007

(22) Filed: Mar. 25, 2004

(51) Int. Cl.⁷ .................. A01K 85/00; A01K 85/01
(52) U.S. Cl. ............... 43/42.26; 43/42.06; 43/42.09; 43/42.24; 43/42.47
(58) Field of Search .............. 43/42, 42.06, 42.09, 43/42.11, 42.13, 42.15, 42.19, 42.24, 42.26, 43/42.28, 42.47; D22/125, 126, 129, 130, D22/132

(56) References Cited

U.S. PATENT DOCUMENTS

| | | | | |
|---|---|---|---|---|
| 885,861 | A * | 4/1908 | Pepper | 43/42.26 |
| 1,540,586 | A * | 6/1925 | Adam | 43/42.26 |
| 1,813,722 | A * | 7/1931 | Wright et al. | 43/42.26 |
| 1,842,751 | A * | 1/1932 | Hannon et al. | 43/42.26 |
| 1,913,362 | A * | 6/1933 | Catarau | 43/42.06 |
| 2,004,308 | A * | 6/1935 | Catarau | 43/42.06 |
| 2,171,372 | A * | 8/1939 | Peck | 43/42.06 |
| 2,266,234 | A * | 12/1941 | Mitchell | 43/42.13 |
| 2,284,183 | A * | 5/1942 | Wade | 43/42.26 |
| 2,383,246 | A * | 8/1945 | Fiskaali | 43/42.06 |
| 2,402,853 | A * | 6/1946 | Sweeney | 43/42.24 |
| D154,141 | S * | 6/1949 | Pilblad | D22/129 |
| 2,516,133 | A * | 7/1950 | Martin | 43/42.13 |
| D160,976 | S * | 11/1950 | Shroff | D22/130 |
| 2,573,592 | A * | 10/1951 | Nickel | 43/42.09 |
| 2,607,151 | A * | 8/1952 | Morris et al. | 43/42.15 |
| 2,611,205 | A * | 9/1952 | Steel | 43/42.47 |
| 2,703,945 | A * | 3/1955 | Johnson | 43/42.06 |
| 2,716,630 | A * | 9/1955 | Burden | 43/42.06 |
| 2,749,647 | A * | 6/1956 | Beloff | 43/42.06 |
| 2,785,497 | A * | 3/1957 | Berry | 43/42.26 |
| 2,803,915 | A * | 8/1957 | Zwiercan | 43/42.06 |
| 2,937,467 | A * | 5/1960 | Capps | 43/42.06 |
| 2,994,982 | A * | 8/1961 | Murawski | 43/42.06 |
| 3,105,317 | A * | 10/1963 | Fox | 43/42.06 |
| 3,187,457 | A * | 6/1965 | Karisch | 43/42.06 |
| 3,243,912 | A * | 4/1966 | Newman | 43/42.47 |
| 3,367,059 | A * | 2/1968 | Puls et al. | 43/42.24 |
| D222,058 | S * | 9/1971 | Meadors | D22/126 |
| 3,680,246 | A * | 8/1972 | Florek | 43/42.19 |
| 4,038,774 | A * | 8/1977 | Misiak | 43/42.09 |
| 4,138,792 | A * | 2/1979 | Hill | 43/42.24 |
| 4,567,685 | A * | 2/1986 | Duncan | 43/42.15 |
| 4,771,567 | A * | 9/1988 | Cannon | 43/42.26 |

(Continued)

Primary Examiner—Darren W. Ark

(57) ABSTRACT

A fishing lure apparatus includes a simulated turtle body which includes a simulated turtle bottom portion and a simulated turtle shell portion supported by the simulated turtle bottom portion. Simulated turtle legs are connected to the simulated turtle body. A simulated turtle tail is also connected to the simulated turtle body. A simulated turtle head is also connected to the simulated turtle body, and one or more fish hooks are connected to either the simulated turtle body, the simulated turtle legs, or the simulated turtle tail. One or more hook-reception eyes are connected to the simulated turtle body for receiving fish hooks. A spoon portion is connected to the simulated turtle body. Each of the simulated turtle legs includes a leg hook and a simulated turtle leg covering attached to the leg hook. The simulated turtle tail includes a tail hook, and a simulated turtle tail covering is attached to the tail hook.

12 Claims, 3 Drawing Sheets

U.S. PATENT DOCUMENTS

| | | | | |
|---|---|---|---|---|
| 4,790,100 A | * | 12/1988 | Green, Sr. | 43/42.26 |
| D300,449 S | * | 3/1989 | Tucker | D22/132 |
| 4,862,630 A | * | 9/1989 | Welch | 43/42.26 |
| D305,258 S | * | 12/1989 | Bybee | D22/132 |
| 4,893,431 A | * | 1/1990 | Ehlers | 43/42.47 |
| 4,912,871 A | * | 4/1990 | Brady | 43/42.26 |
| 4,928,422 A | * | 5/1990 | Pitre | 43/42 |
| D320,639 S | * | 10/1991 | McClenahan et al. | D22/126 |
| 5,170,579 A | * | 12/1992 | Hollinger | 43/42.06 |
| 5,546,694 A | * | 8/1996 | Wilkinson | 43/42.47 |
| D374,904 S | * | 10/1996 | Miller | D22/119 |
| 5,657,575 A | * | 8/1997 | Miller et al. | 43/131 |
| 5,934,008 A | * | 8/1999 | Rice | 43/42.26 |
| 5,943,817 A | * | 8/1999 | Miller | 43/131 |
| 5,950,347 A | * | 9/1999 | McQueeny | 43/42.15 |
| 5,970,647 A | * | 10/1999 | Watkins | 43/42.09 |
| 5,974,724 A | * | 11/1999 | Pope | 43/42.26 |
| 6,082,035 A | * | 7/2000 | Groff | 43/2 |
| 6,122,856 A | * | 9/2000 | Hnizdor | 43/42.28 |
| 6,237,276 B1 | * | 5/2001 | Storelli | 43/43.15 |
| 6,536,155 B1 | * | 3/2003 | VanRisseghem | 43/42.13 |
| 6,588,138 B1 | * | 7/2003 | Gilbert | 43/42.06 |
| 6,779,293 B1 | * | 8/2004 | Rice | 43/42.06 |
| 2003/0233783 A1 | * | 12/2003 | Storelli | 43/43.15 |

* cited by examiner

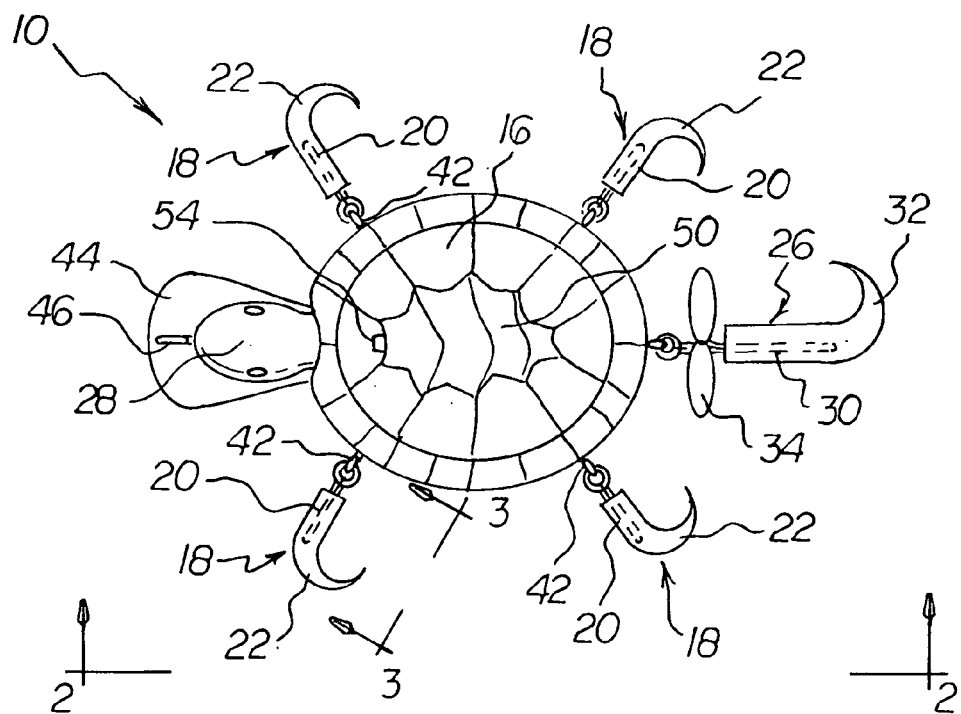
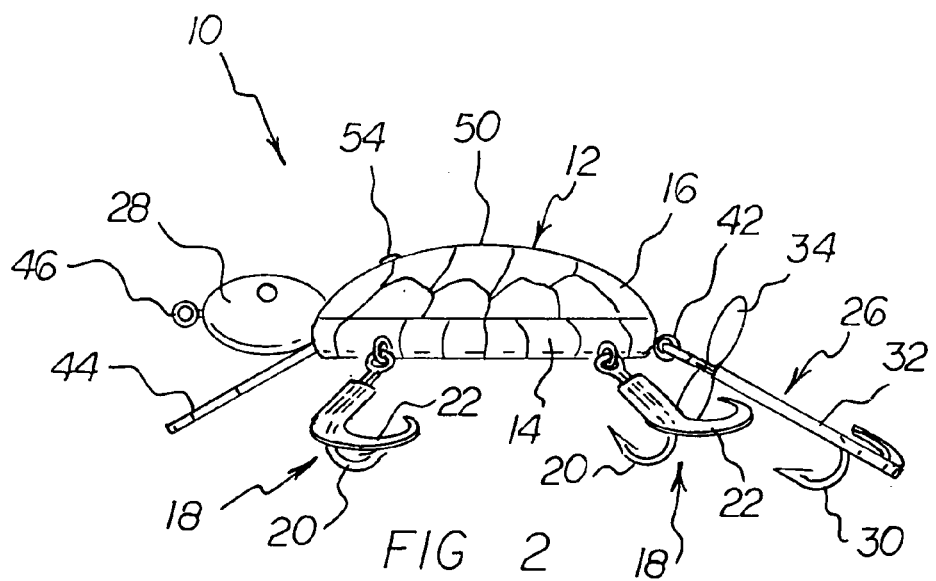

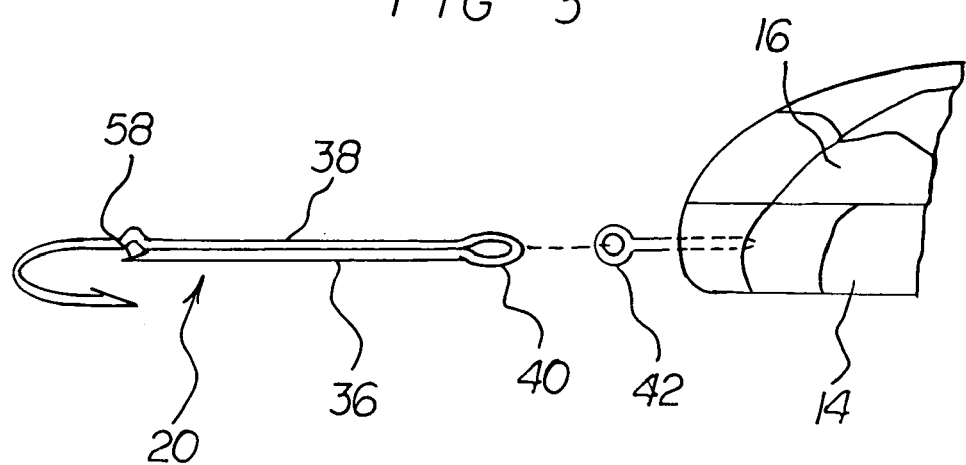
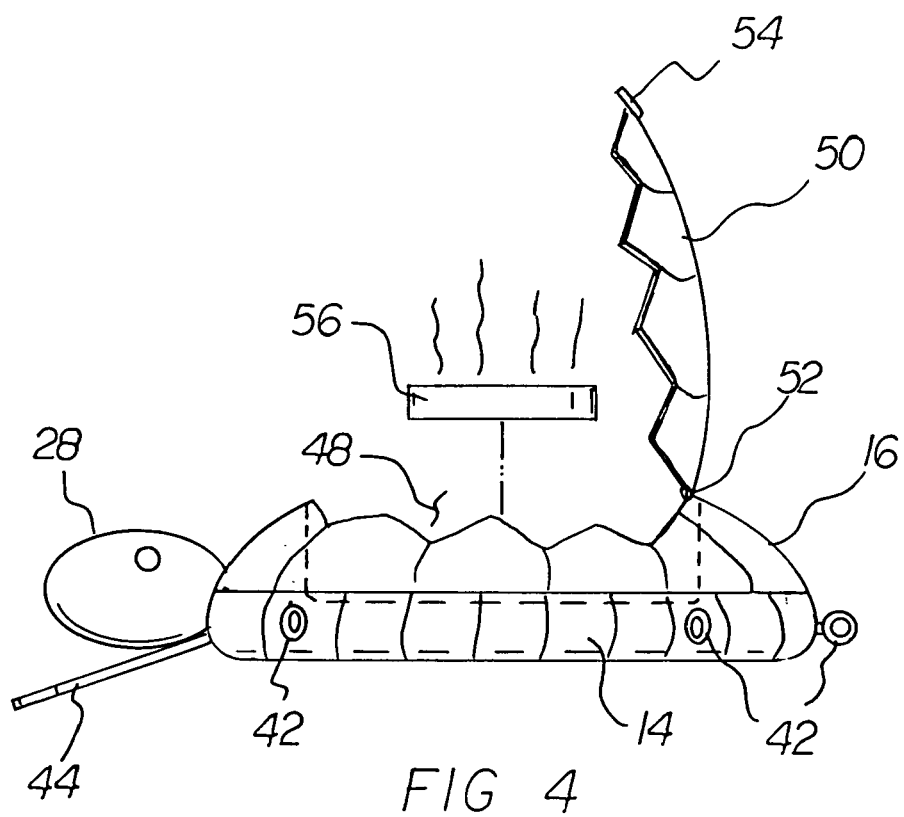

SIMULATED TURTLE FISHING LURE APPARATUS

BACKGROUND OF THE INVENTION

1. Field of the Invention

The present invention relates generally to fishing lures, and, more particularly, to fishing lures especially adapted for simulating water-borne creatures.

2. Description of the Prior Art

Fishing lures that resemble some water-borne creatures are known in the prior art. However, one water-borne creature for which a fishing lure is not known in the prior art is a turtle. Since turtles vary in size and have attractive patterns of coloration, turtles are often attractive to fish. In this respect, it would be desirable if a fishing lure were provided that simulated a turtle.

More specifically, a turtle has a body, a head, legs, and a tail. In this respect, it would be desirable if a fishing lure were provided which included a simulated turtle body, a simulated turtle head, simulated turtle legs, and a simulated turtle tail.

Often a fishing lure can be modified to enhance its attractive features. That is, attachments can be added and subtracted from a conventional fishing lure. With this principle in mind, it would be desirable if a simulated turtle fishing lure were provided with attachments to modify the attractive features of the fishing lure.

With a variety of attachments to choose from, it would be desirable if a simulated turtle fishing lure apparatus included features that permit ready substitution of interchangeable attachments.

Fishing lures often appeal to the senses of sight and sound of fish. Yet, the sense of smell of fish can also be used to attract fish. In this respect, it would be desirable of a simulated turtle fishing lure apparatus were provided with means for dispensing a scent for attracting fish.

One visually attractive sight for fish can be the wavy movement of appendages on a fishing lure. In this respect, it would be desirable if a simulated turtle fishing lure apparatus were provided with a flexible legs and a flexible tail that can provide a wavy movement as the fishing lure is moved through the water.

Thus, while the foregoing indicates it to be well known to use fishing lures resembling different creatures, the foregoing does not teach or suggest a simulated turtle fishing lure apparatus which has the following combination of desirable features: (1) simulates the appearance and movement of a turtle through water; (2) includes a simulated turtle body, a simulated turtle head, simulated turtle legs, and a simulated turtle tail; (3) can be provided with attachments to modify the attractive features of the fishing lure; (4) includes features that permit ready substitution of interchangeable attachments; (5) is provided with means for dispensing a scent into the water for attracting fish; and (6) is provided with flexible legs and a flexible tail that can provide a wavy movement as the fishing lure is moved through the water. The foregoing desired characteristics are provided by the unique simulated turtle fishing lure apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing lure apparatus which includes a simulated turtle body which includes a simulated turtle bottom portion and a simulated turtle shell portion supported by the simulated turtle bottom portion. Simulated turtle legs are connected to the simulated turtle body. A simulated turtle tail is also connected to the simulated turtle body. A simulated turtle head is also connected to the simulated turtle body, and one or more fish hooks are connected to either the simulated turtle body, the simulated turtle legs, or the simulated turtle tail.

One or more hook-reception eyes are connected to the simulated turtle body for receiving the respective fish hook. A spoon portion is connected to the simulated turtle body.

Each of the simulated turtle legs includes a leg hook and a simulated turtle leg covering attached to the leg hook. The simulated turtle tail includes a tail hook, and a simulated turtle tail covering is attached to the tail hook.

The tail hook and/or each leg hook can include a first shank portion, a second shank portion in contact with the first shank portion, and shank-to-shank connecting loop connected between the first shank portion and the second shank portion. The first shank portion, the second shank portion, and the shank-to-shank connecting loop provide a quick change hook on an eye. A spinner can be supported by the tail hook.

Preferably, the simulated turtle body includes a scent-emission chamber which is located between the simulated turtle shell portion and the simulated turtle bottom portion. A chamber cover is connected to the simulated turtle shell portion and covers the scent-emission chamber. A cover hinge is connected between the chamber cover and the simulated turtle shell portion. A cover lock is connected to the chamber cover for locking the chamber cover to the simulated turtle shell portion.

With another embodiment of the invention, the simulated turtle legs include flexible leg members, and a head-to-body hook extends from the simulated turtle head to the simulated turtle body.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved simulated turtle fishing lure apparatus which has all of the advantages of the prior art and none of the disadvantages.

It is another object of the present invention to provide a new and improved simulated turtle fishing lure apparatus which may be easily and efficiently manufactured and marketed.

It is a further object of the present invention to provide a new and improved simulated turtle fishing lure apparatus which is of durable and reliable construction.

An even further object of the present invention is to provide a new and improved simulated turtle fishing lure apparatus which is susceptible of a low cost of manufacture with regard to both materials and labor, and which accordingly is then susceptible of low prices of sale to the consuming public, thereby making such simulated turtle fishing lure apparatus available to the buying public.

Still yet a further object of the present invention is to provide a new and improved simulated turtle fishing lure apparatus which simulates the appearance and movement of a turtle through water.

Still another object of the present invention is to provide a new and improved simulated turtle fishing lure apparatus that includes a simulated turtle body, a simulated turtle head, simulated turtle legs, and a simulated turtle tail.

Yet another object of the present invention is to provide a new and improved simulated turtle fishing lure apparatus which can be provided with attachments to modify the attractive features of the fishing lure.

Even another object of the present invention is to provide a new and improved simulated turtle fishing lure apparatus that includes features that permit ready substitution of interchangeable attachments.

Still a further object of the present invention is to provide a new and improved simulated turtle fishing lure apparatus which is provided with means for dispensing a scent into the water for attracting fish.

Yet another object of the present invention is to provide a new and improved simulated turtle fishing lure apparatus that is provided with flexible legs and a flexible tail that can provide a wavy movement as the fishing lure is moved through the water.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a top view showing a first embodiment of the simulated turtle fishing lure apparatus of the invention, wherein the simulated turtle legs include hooks and simulated leg coverings for the hooks, and wherein a cover for an internal scent-emission chamber is closed.

FIG. 2 is a side view of the embodiment of the simulated turtle fishing lure apparatus shown in FIG. 1 taken along line 2—2 of FIG. 1.

FIG. 3 is an enlarged, partially exploded, partial side view of the embodiment of the simulated turtle fishing lure apparatus of FIG. 1 taken along line 3—3 thereof, wherein a simulated leg covering is removed from a hook.

FIG. 4 is a side view of the first embodiment of the invention, wherein the cover for the internal scent-emission chamber is open.

DESCRIPTION OF THE PREFERRED EMBODIMENT

Figure 5:
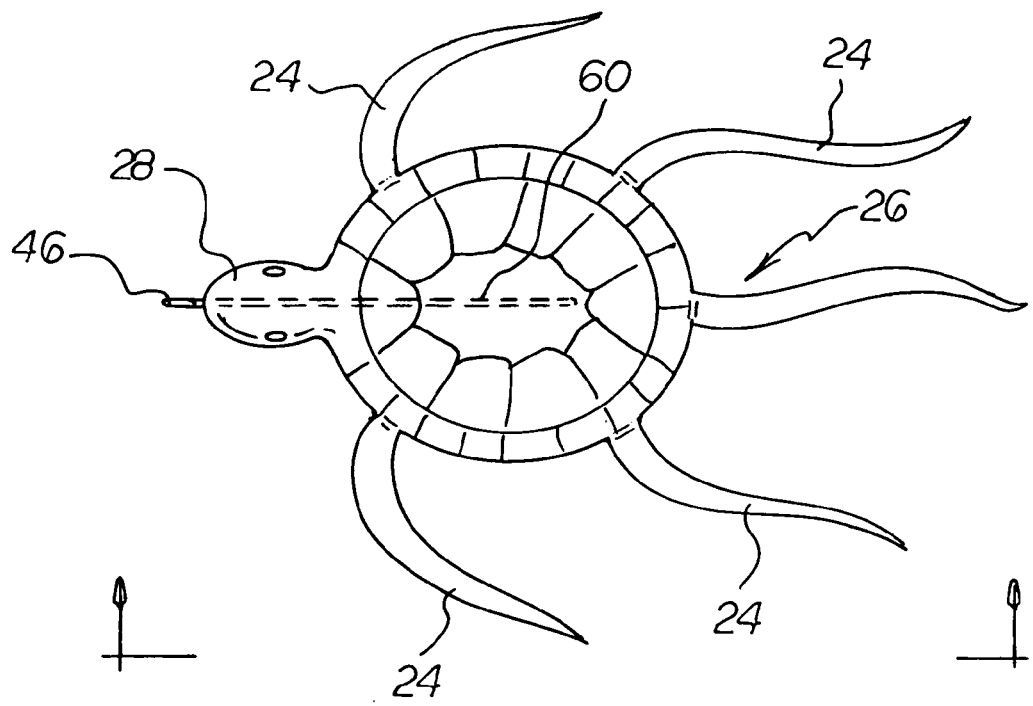
FIG. 5 is a top view of a second embodiment of the invention, wherein the simulated turtle legs include flexible leg members.

With reference to the drawings, a new and improved simulated turtle fishing lure apparatus embodying the principles and concepts of the present invention will be described.

A fishing lure apparatus 10 includes a simulated turtle body 12 which includes a simulated turtle bottom portion 14 and a simulated turtle shell portion 16 supported by the simulated turtle bottom portion 14. Simulated turtle legs 18 are connected to the simulated turtle body 12. A simulated turtle tail 26 is also connected to the simulated turtle body 12. A simulated turtle head 28 is also connected to the simulated turtle body 12, and one or more fish hooks are connected to either the simulated turtle body 12, the simulated turtle legs 18, or the simulated turtle tail 26. The simulated turtle head 28 includes a line-connection eye 46 for connecting to a fishing line (not shown).

As shown in FIGS. 1 and 2, one or more hook-reception eyes 42 are connected to the simulated turtle body 12 for receiving the respective fish hook. A spoon portion 44 is connected to the simulated turtle body 12.

Each of the simulated turtle legs 18 includes a leg hook 20, and a simulated turtle leg covering 22 attached to the leg hook 20. Each of the leg hooks 20 is connected to a respective hook-reception eye 42.

The simulated turtle tail 26 includes a tail hook 30, and a simulated turtle tail covering 32 is attached to the tail hook 30. The tail hook 30 is connected to one of the hook-reception eyes 42.

The tail hook 30 includes a first shank portion 36, a second shank portion 38 in contact with the first shank portion 36, and shank-to-shank connecting loop 40 connected between the first shank portion 36 and the second shank portion 38. The tail hook 30 which includes the first shank portion 36 and the second shank portion 38 is known as a quick change hook. To install such a quick change hook on a hook-reception eye 42, the free end of the first shank portion 36 is pushed against the hook-reception eye 42. The free end of the first shank portion 36 can have a sloped end 58 that facilitates the moving of the hook-reception eyes 42 between the first shank portion 36 and the second shank portion 38. Once the hook-reception eye 42 enters the shank-to-shank connecting loop 40, the first shank portion 36 and the second shank portion 38 snap together, and the leg hook 20 is installed on the hook-reception eye 42.

To remove a quick change hook from a hook-reception eye 42, the first shank portion 36 and the second shank portion 38 are spread apart, such as by a knife blade, and the hook-reception eye 42 is slid between the first shank portion 36 and the second shank portion 38 until the hook-reception eye 42 is released at the free end of the first shank portion 36.

The use of quick change hooks allows a fisherman to quickly change interchangeable simulated turtle legs 18 and simulated turtle tails 26 attached to the simulated turtle body 12. Other attachments besides hooks can have the quick change structure for attaching to eyes 42.

A spinner 34 can be supported by the tail hook 30. The spinner 34 can provide additional flash and movement to attract a fish.

The simulated turtle body 12 includes a scent-emission chamber 48 which is located between the simulated turtle shell portion 16 and the simulated turtle bottom portion 14. A chamber cover 50 is connected to the simulated turtle shell portion 16 and covers the scent-emission chamber 48. A cover hinge 52 is connected between the chamber cover 50 and the simulated turtle shell portion 16. A cover lock 54 is connected to the chamber cover 50 for locking the chamber cover 50 to the simulated turtle shell portion 16.

FIG. 4 shows the chamber cover 50 in an open condition and a scent wafer 56 is added to the scent-emission chamber 48. Once the scent wafer 56 has been added to the scent-emission chamber 48, the chamber cover 50 is closed, and the cover lock 54 locks the chamber cover 50 against the simulated turtle shell portion 16. The cover lock 54 can be a snap lock.

Figure 6:
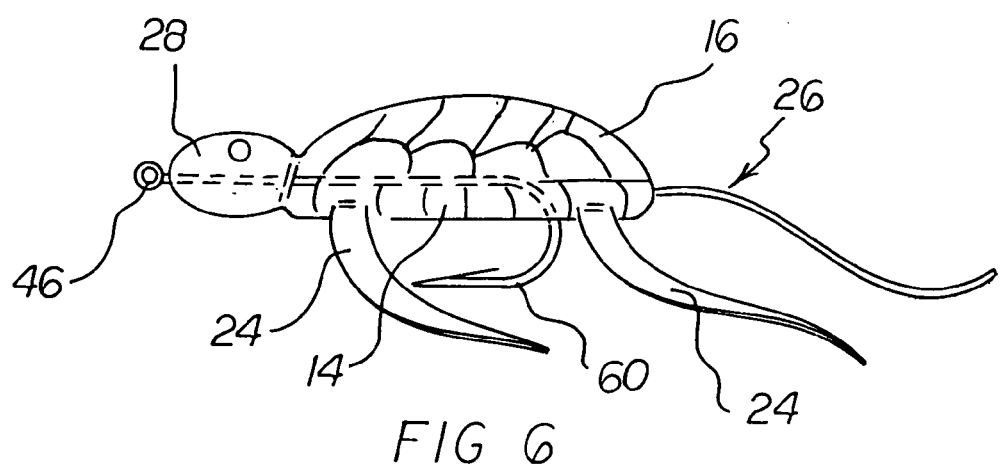
FIG. 6 is a side view of the embodiment of the invention shown in FIG. 5, taken along line 6—6 thereof.

With the embodiment of the invention shown in FIGS. 5 and 6, the simulated turtle legs 18 include flexible leg members 24. The flexible leg members 24 are made from a soft rubber. A suitable soft rubber is found in a zoom lizard soft bait. In addition, the simulated turtle tail 26 is also made from a flexible soft rubber material. The flexible simulated turtle legs 18 and the flexible simulated turtle tail 26 provide attractive movement in the water when the simulated turtle fishing lure apparatus is pulled through the water by a fishing line. The flexible legs and the flexible tail provide a wavy movement as the fishing lure is moved through the water.

The one or more fish hooks include a head-to-body hook 60. That is, the shank of the head-to-body hook 60 extends from the simulated turtle head 28 to the simulated turtle bottom portion 14. The hook portion of the head-to-body hook 60 extends downward from the simulated turtle bottom portion 14.

The simulated turtle fishing lure apparatus 10 of the invention can simulate a wide variety of turtles. For example, the simulated turtle fishing lure apparatus can simulate the following types of turtles: painted turtles; turtleman; snapping turtles; miniature turtles; soft shelled turtles; mud turtles; sea turtles; baby turtles; and adult turtles, among others. The painted turtles can be natural colors or bright artificial colors. The simulated turtle shell portions 16 can also include colorful spots and other attractive designs.

The simulated turtle fishing lure apparatus of the invention can be provided with multiple sets of attachments that can be interchangeable on the eyes 42. Attachment to the simulated turtle fishing lure apparatus of the invention can includes plugs that float, suspend, or dive. The spoon portion 44 can aid in causing the simulated turtle fishing lure apparatus to dive in the water when the simulated turtle fishing lure apparatus is pulled along by a fishing line (not shown).

The components of the simulated turtle fishing lure apparatus of the invention can be made from inexpensive and durable metal, plastic, and rubber materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved simulated turtle fishing lure apparatus that is low in cost, relatively simple in design and operation, and which may advantageously be used to simulate the appearance and movement of a turtle through water. With the invention, a simulated turtle fishing lure apparatus is provided which includes a simulated turtle body, a simulated turtle head, simulated turtle legs, and a simulated turtle tail. With the invention, a simulated turtle fishing lure apparatus is provided which can be provided with attachments to modify the attractive features of the fishing lure. With the invention, a simulated turtle fishing lure apparatus is provided which includes features that permit ready substitution of interchangeable attachments. With the invention, a simulated turtle fishing lure apparatus is provided which is provided with means for dispensing a scent into the water for attracting fish. With the invention, a simulated turtle fishing lure apparatus is provided which is provided with flexible legs and a flexible tail that can provide a wavy movement as the fishing lure is moved through the water.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A fishing lure apparatus, comprising:
a simulated turtle body which includes a simulated turtle bottom portion and a simulated turtle shell portion supported by said simulated turtle bottom portion,
simulated turtle legs connected to said simulated turtle body,
a simulated turtle tail connected to said simulated turtle body,
a simulated turtle head connected to said simulated turtle body, and
one or more fish hooks connected to at least one of said simulated turtle body, said simulated turtle legs, and said simulated turtle tail,
wherein said simulated turtle tail includes:
a tail hook of said one or more fish hooks, and
a simulated turtle tail covering attached to said tail hook.

2. The apparatus of claim 1 wherein said tail hook includes:
a first shank portion,
a second shank portion in contact with said first shank portion, and a shank-to-shank connecting loop connected between said first shank portion and said second shank portion.

3. The apparatus of claim 1, further including:

a spinner supported by said tail hook.

4. A fishing lure apparatus, comprising:

a simulated turtle body which includes a simulated turtle bottom portion and a simulated turtle shell portion supported by said simulated turtle bottom portion, simulated turtle legs connected to said simulated turtle body, a simulated turtle tail connected to said simulated turtle body, a simulated turtle head connected to said simulated turtle body, and one or more fish hooks connected to at least one of said simulated turtle body, said simulated turtle legs, and said simulated turtle tail, wherein each of said simulated turtle legs includes:

a leg hook of said one or more fish hooks, and a simulated turtle leg covering attached to said leg hook.

5. The apparatus of claim 4 wherein said simulated turtle tail includes:

a tail hook of said one or more fish hooks, and a simulated turtle tail covering attached to said tail hook, and said tail hook includes:

a first shank portion, a second shank portion in contact with said first shank portion, and a shank-to-shank connecting loop connected between said first shank portion and said second shank portion.

6. The apparatus of claim 5, further including:

a spinner supported by said tail hook.

7. The apparatus of claims 4 or 1, further including:

one or more hook-reception eyes connected to said simulated turtle body for receiving said one or more fish hooks.

8. The apparatus of claims 4 or 1, further including:

a spoon portion connected to said simulated turtle body.

9. The apparatus of claims 4 or 1 wherein said simulated turtle body includes a scent-emission chamber which is located between said simulated turtle shell portion and said simulated turtle bottom portion.

10. The apparatus of claim 9, further including:

a chamber cover connected to said simulated turtle shell portion and covering said scent-emission chamber.

11. The apparatus of claim 10, further including:

a cover hinge connected between said chamber cover and said simulated turtle shell portion.

12. The apparatus of claim 10, further including:

a cover lock connected to said chamber cover for locking said chamber cover to said simulated turtle shell portion.

* * * * *